United States Patent
Yu

(10) Patent No.: US 11,511,857 B2
(45) Date of Patent: *Nov. 29, 2022

(54) AERIAL VEHICLE CONTROL METHOD AND AERIAL VEHICLE

(71) Applicant: SZ DJI TECHNOLOGY CO., LTD., Shenzhen (CN)

(72) Inventor: Yun Yu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 232 days.

This patent is subject to a terminal disclaimer.

(21) Appl. No.: 16/774,282

(22) Filed: Jan. 28, 2020

(65) Prior Publication Data

US 2020/0159253 A1  May 21, 2020

Related U.S. Application Data

(63) Continuation of application No. 15/622,363, filed on Jun. 14, 2017, now Pat. No. 10,551,853, which is a
(Continued)

(51) Int. Cl.
*G05D 1/10* (2006.01)
*G05D 1/00* (2006.01)
(Continued)

(52) U.S. Cl.
CPC ............ *B64C 39/024* (2013.01); *G01S 19/42* (2013.01); *G05D 1/0011* (2013.01); *B64C 2201/12* (2013.01)

(58) Field of Classification Search
CPC .................................................. B64C 39/024
See application file for complete search history.

(56) References Cited

U.S. PATENT DOCUMENTS 6,128,470 A * 10/2000 Naidu .................. H01Q 3/2605
455/14
8,774,982 B2    7/2014 Oakley et al.
(Continued)

FOREIGN PATENT DOCUMENTS

CN          1707378 A    12/2005
CN        102298389 A    12/2011
(Continued)

OTHER PUBLICATIONS

The World Intellectual Property Organization (WIPO) International Search Report for PCT/CN2014/093893 dated Sep. 21, 2015 6 Pages.

*Primary Examiner* — Peter D Nolan
*Assistant Examiner* — Ce Li Li
(74) *Attorney, Agent, or Firm* — Anova Law Group, PLLC

(57) ABSTRACT

An aerial vehicle control method includes detecting a flight control instruction during returning of an aerial vehicle to a return point along a return trajectory according to an auto return instruction. The flight control instruction determines a predetermined trajectory different from the return trajectory. The method further includes generating a superimposed instruction by superimposing return point position information indicating the return point and the flight control instruction. The superimposed instruction determines a flight trajectory that is an integration of the return trajectory and the predetermined trajectory and that is different from the return trajectory and the predetermined trajectory. The method also includes controlling the aerial vehicle to fly along the flight trajectory according to the superimposed instruction.

18 Claims, 5 Drawing Sheets

Related U.S. Application Data continuation of application No. PCT/CN2014/093893, filed on Dec. 15, 2014.

(51) Int. Cl.
*B64C 39/02* (2006.01)
*G01S 19/42* (2010.01)

(56) References Cited

U.S. PATENT DOCUMENTS

| | | | | |
|---|---|---|---|---|
| 2010/0250022 | A1* | 9/2010 | Hines | G05D 1/0044 701/2 |
| 2015/0120094 | A1 | 4/2015 | Kimchi et al. | |
| 2015/0205301 | A1 | 7/2015 | Gilmore | |
| 2015/0232181 | A1* | 8/2015 | Oakley | B64C 39/024 701/2 |
| 2015/0336667 | A1 | 11/2015 | Srivastava et al. | |
| 2016/0068267 | A1 | 3/2016 | Liu et al. | |
| 2016/0114886 | A1 | 4/2016 | Downey et al. | |
| 2016/0125746 | A1* | 5/2016 | Kunzi | G01S 15/87 701/11 |
| 2016/0196525 | A1 | 7/2016 | Kantor et al. | |
| 2016/0246304 | A1 | 8/2016 | Canoy et al. | |
| 2017/0137126 | A1 | 5/2017 | Wong et al. | |
| 2017/0372256 | A1 | 12/2017 | Kantor et al. | |

FOREIGN PATENT DOCUMENTS

| | | |
|---|---|---|
| CN | 102331783 A | 1/2012 |
| CN | 102508447 A | 6/2012 |
| CN | 102520727 A | 6/2012 |
| CN | 102749927 A | 10/2012 |
| CN | 102955478 A | 3/2013 |
| CN | 202939489 U | 5/2013 |
| CN | 103411609 A | 11/2013 |
| CN | 203397214 U | 1/2014 |
| CN | 103611324 A | 3/2014 |
| CN | 103868521 A | 6/2014 |
| CN | 103869811 A | 6/2014 |
| CN | 104166355 A | 11/2014 |
| EP | 2228301 A2 | 9/2010 |

* cited by examiner

AERIAL VEHICLE CONTROL METHOD AND AERIAL VEHICLE

CROSS-REFERENCE TO RELATED APPLICATION

This is a continuation application of U.S. application Ser. No. 15/622,363, filed on Jun. 14, 2017, now U.S. Pat. No. 10,551,853, which is a continuation application of International Application No. PCT/CN2014/093893, filed on Dec. 15, 2014, the entire contents of both of which are incorporated herein by reference.

TECHNICAL FIELD

The present disclosure relates to the field of aerial vehicle technologies, and in particular, to aerial vehicle control methods and aerial vehicles.

BACKGROUND

Currently, aerial vehicles include fixed wing aerial vehicles and rotor aerial vehicles. The rotor aerial vehicles achieve take-off, landing or flying by driving the rotors by motors.

In order to make an aerial vehicle return to a take-off position or return to a return point specified by a user, the aerial vehicle is set to be in a return mode and performs auto return.

However, in the process of return of the aerial vehicle, the user cannot operate the aerial vehicle; hence, it is impossible to deal with an emergency or perform a user-expected action in the process of return, thus compromising the operation flexibility.

SUMMARY

Embodiments of the present disclosure provide an aerial vehicle control method, device and an aerial vehicle, which can achieve more flexible operations of the aerial vehicle.

In one aspect, the present disclosure provides an aerial vehicle control method including, upon receipt of an auto return instruction, controlling power output of an aerial vehicle in accordance with return point position information to cause the aerial vehicle to return to a return point indicated by the return point position information, and during returning to the return point, if a flight control instruction is detected, adjusting the power output of the aerial vehicle in accordance with the flight control instruction.

In another aspect, the present disclosure provides an aerial vehicle including a power assembly and a flight control system. The power assembly is configured to provide power output for the aerial vehicle. The flight control system is configured to, upon receipt of an auto return instruction: control the power output of the power assembly in accordance with return point position information to cause the aerial vehicle to return to a return point indicated by the return point position information, and during returning to the return point, if a flight control instruction is detected, adjust the power output of the power assembly in accordance with the flight control instruction.

According to the embodiments of the present disclosure, a flight control instruction can be received in the process of return, which makes the aerial vehicle operation more flexible, and can meet more user demands.

DETAILED DESCRIPTION OF THE EMBODIMENTS

The technical solutions of the present disclosure will be described below in detail with reference to the accompanying drawings. The described embodiments are merely some of the embodiments of the present disclosure rather than all of the embodiments. All other embodiments obtained by a person of ordinary skill in the art based on the embodiments of the present disclosure without creative efforts shall fall within the scope of the present disclosure.

Unless there are conflicting features, the following embodiments and features therein can be combined with each other.

Figure 1:
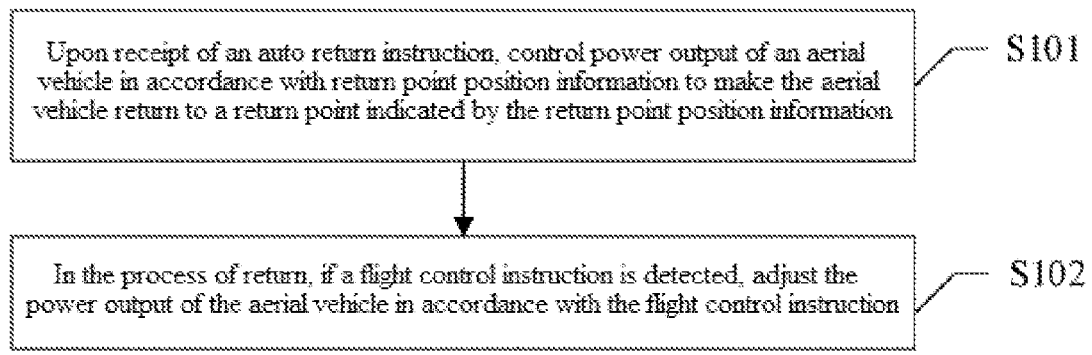
FIG. 1 is a schematic flow chart of one aerial vehicle control method according to one embodiment of the present disclosure.

Referring to FIG. 1, FIG. 1 is a schematic flow chart of one aerial vehicle control method according to an embodiment of the present disclosure. The methods according to the embodiments of the present disclosure may be applied to a variety of aerial vehicles such as multi-rotor aerial vehicles and fixed-wing aerial vehicles, wherein the multi-rotor aerial vehicles may further include various kinds of aerial vehicles such as four-rotor aerial vehicles, six-rotor aerial vehicles, eight-rotor aerial vehicles and other aerial vehicles with more or less rotors. Specifically, one method disclosed herein comprises:

S101: Upon receipt of an auto return instruction, control power output of an aerial vehicle in accordance with return point position information to make the aerial vehicle return to a return point. Specifically, a signal received by the aerial vehicle is detected, and if an auto return instruction is received, power output of the aerial vehicle is determined in accordance with a return point, to make the aerial vehicle fly towards the return point. In the process of auto return, the aerial vehicle flies towards the return point in accordance with pre-set attitude information, wherein the attitude information may include a flight altitude, a flight speed, a flight direction and so on.

The auto return instruction may be: a return instruction sent from a remote control end, a return instruction generated when a remote control signal from the remote control end is not received within a pre-set time range, or a return instruction generated when it is detected that a battery capacity value reaches a return required value and the aerial vehicle has to return.

The return point position information may be: user-configured, or automatically-set (for example, an automatically-set take-off point) return point GPS (Global Positioning System) coordinates, and may also be information about a relative distance between the return point and a current position, direction information, or other information.

S102: In the process of return, if a flight control instruction is detected, adjust the power output of the aerial vehicle in accordance with the flight control instruction.

Specifically, direction and speed control signals are generated for a power assembly of the aerial vehicle in accordance with the flight control instruction through a predetermined algorithm, and power output of the power assembly is adjusted accordingly, so as to adjust flight attitude of the aerial vehicle, which may include adjusting one or more of a flight altitude, a flight speed and a flight direction of the aerial vehicle. The power assembly may include an electronic speed adjustor, a motor, a propeller and so on.

The detection action may be completed through a signal receiving element, when it is detected that strength of the signal received is greater than a pre-set threshold, the signal is considered as a flight control instruction and the flight control instruction is executed, otherwise, the signal detected is ignored.

With the aerial vehicle control methods according to the embodiments of the present disclosure, a flight control instruction can be received in the process of return, which makes the aerial vehicle operation more flexible and can meet more demands of users.

Figure 2:
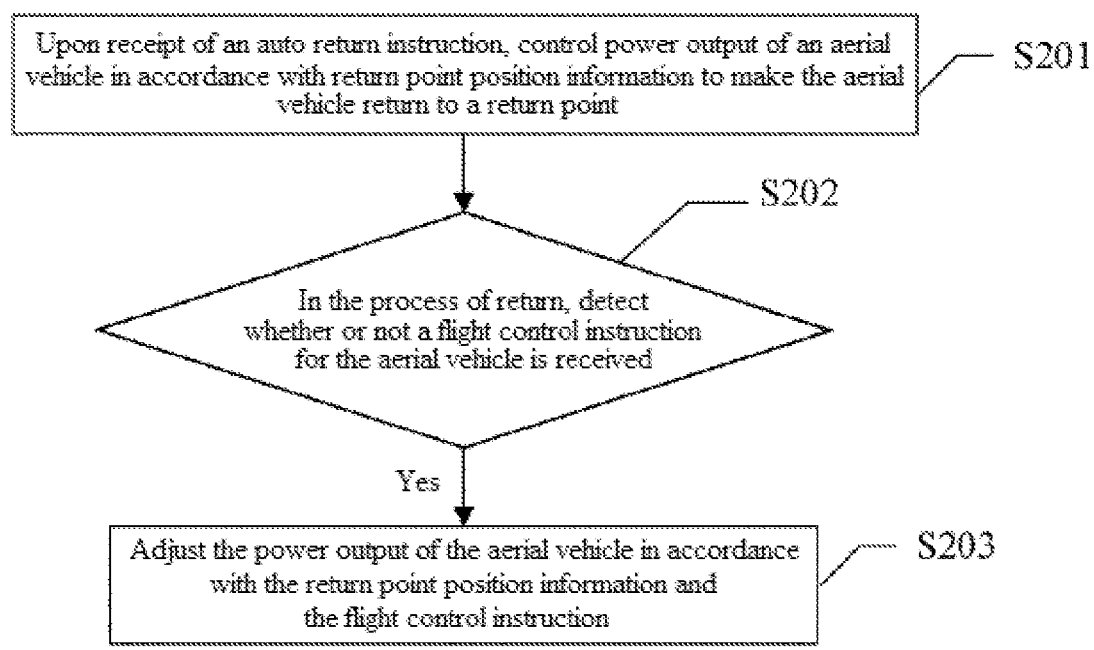
FIG. 2 is a schematic flow chart of another aerial vehicle control method according to another embodiment of the present disclosure.

Referring to FIG. 2, FIG. 2 illustrates another aerial vehicle control method according to another embodiment of the present disclosure. Specifically, the method comprises:

S201: Upon receipt of an auto return instruction, control power output of an aerial vehicle in accordance with return point position information to make the aerial vehicle return to a return point.

Specifically, a signal received by the aerial vehicle is detected, and if an auto return instruction is received, power output of the aerial vehicle is determined in accordance with a return point, and a corresponding control instruction is generated and sent to a power assembly, to make the aerial vehicle fly towards the return point. In the process of auto return, the aerial vehicle flies towards the return point in accordance with pre-set attitude information, wherein the attitude information may include a flight altitude, a flight speed and so on.

The return point position information may include a GPS signal of the return point, and may also be information about a relative distance between the return point and a current position, a direction and other information.

S202: In the process of return, detect whether or not a flight control instruction for the aerial vehicle is received.

In the process of return, whether or not a flight control instruction for the aerial vehicle is received is detected. The flight control instruction may be an operation instruction sent from a user control end to the aerial vehicle, used for controlling power output of the aerial vehicle, so as to achieve a change of attitude of the aerial vehicle to complete a user-expected action.

The detection process may be completed through a signal receiving element, if the strength of the signal received by the signal receiving element is greater than a pre-set threshold, the signal is considered as a flight control instruction, otherwise, the signal is considered as a noise signal and is ignored.

S203: If the flight control instruction for the aerial vehicle is received, adjust the power output of the aerial vehicle in accordance with the return point position information and the flight control instruction.

Specifically, in the process of return of the aerial vehicle, a return instruction may be generated in accordance with the return point position information, for example, GPS information of the return point and so on, the return instruction calculates a specific control instruction for the power assembly through a pre-set algorithm, that is, power output of each power assembly to perform return is calculated, and the control instruction is sent to the power assembly.

When the flight control instruction is received, a return instruction generated in accordance with the return point position information and the fight control instruction may be superimposed. The power output of the aerial vehicle may be controlled in accordance with the superimposed instruction.

At this point, the aerial vehicle superimposes the return instruction on the flight control instruction, that is, on the basis of the power output of each power assembly calculated by the return instruction, the power output of each power assembly to execute the flight control instruction is superimposed thereon, and new power output of each power assembly is calculated through a pre-set algorithm, so as to execute the flight control instruction as the same time when the return instruction is executed.

In the above process, when the aerial vehicle executes the flight control instruction, parameters of the return instruction are also taken into account, and a control instruction is obtained by integrating the flight control instruction and the parameter of the return instruction, to control power output of the aerial vehicle.

In addition, when the flight control instruction is received, it is also feasible to generate a control instruction by integrating the return point position information and the flight control instruction, that is, power output of each power assembly of the aerial vehicle is calculated and calculated through a pre-set algorithm in accordance with the return point position information and the flight control instruction.

In the above process, when the aerial vehicle executes the flight control instruction, parameters of the return point position information are also taken into account, and a control instruction is obtained by integrating the flight control instruction and the parameter of the return point position information, to control power output of the aerial vehicle.

Return of the aerial vehicle is generally rectilinear flight, that is, a relationship between a current position of the aerial vehicle and the return point is calculated to obtain a flight path, and the aerial vehicle flies to a position above the GPS position of the return point, and lands and goes back to the return point. If there is an obstacle between the current position of the aerial vehicle and the return point, the user can perform an operation to send an operation instruction to the aerial vehicle to instruct it to bypass the obstacle. A flight trajectory of the aerial vehicle is determined by a control instruction, wherein the control instruction is obtained by integrated calculation of the return instruction and the flight control instruction, or obtained by integrated calculation of information of the return point and the flight control instruction. Hence, the flight trajectory is between a return trajectory and a predetermined trajectory of the flight control instruction.

The user can send multiple flight control instructions, to ensure that the aerial vehicle bypasses the obstacle. Further, the user can also send the flight control instruction to make the aerial vehicle complete other actions in the process of return, for example, the aerial vehicle flies to a particular position, including flying at a particular altitude or flying a particular distance to shoot a picture and so on.

If the flight control signal is not received, the aerial vehicle continues to return.

In the embodiments of the present disclosure, it is possible to operate the aerial vehicle in the process of return, which enhances security and operation flexibility of the aerial vehicle.

Figure 3:
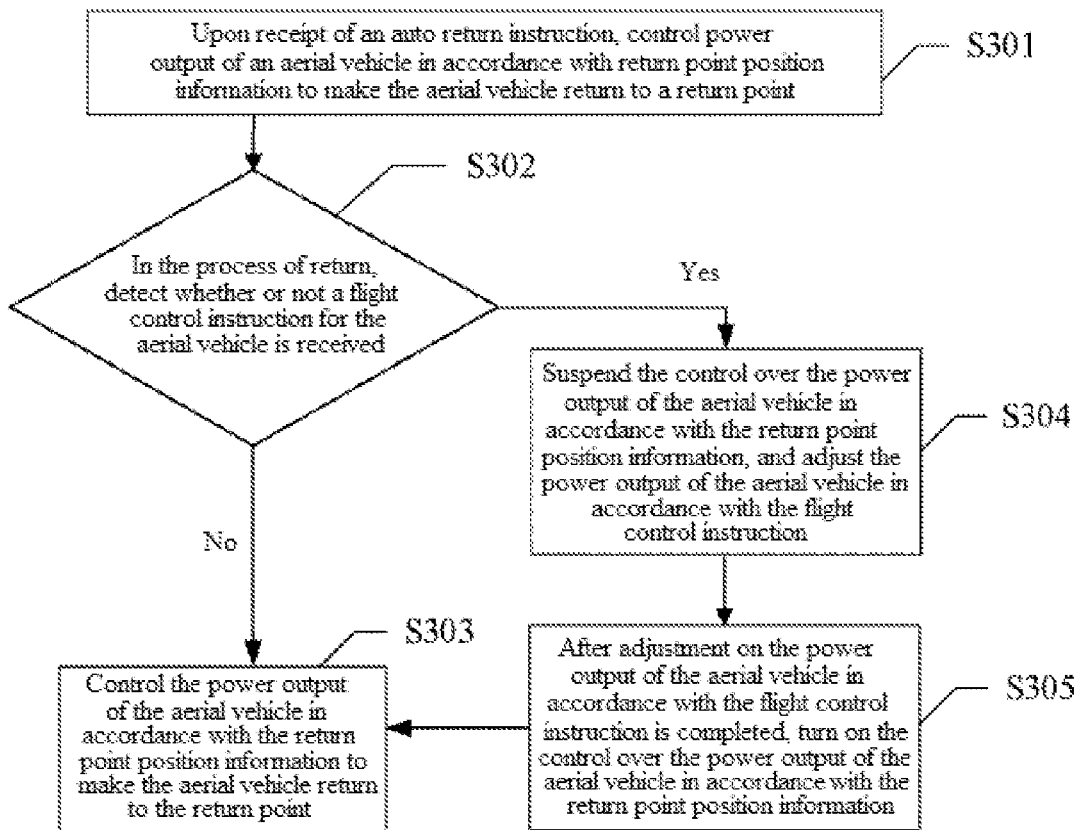
FIG. 3 is a schematic flow chart of another aerial vehicle control method according to yet another embodiment of the present disclosure.

Referring to FIG. 3, FIG. 3 illustrates a further aerial vehicle control method according to another embodiment of the present disclosure, and specifically, the method comprises:

S301: Upon receipt of an auto return instruction, control power output of an aerial vehicle in accordance with return point position information to make the aerial vehicle return to a return point.

S302: In the process of return, detect whether or not a flight control instruction for the aerial vehicle is received.

S303: If the flight control instruction for the aerial vehicle is not received, continue to control the power output of the aerial vehicle in accordance with the return point position information to make the aerial vehicle return to the return point.

S304: If the flight control instruction for the aerial vehicle is received, suspend the control over the power output of the aerial vehicle in accordance with the return point position information, and adjust the power output of the aerial vehicle in accordance with the flight control instruction.

When the flight control instruction is received, it is feasible to interrupt the return, that is, interrupt the control over the power output of the aerial vehicle in accordance with the return point position information, and calculate and set power output of each power assembly of the aerial vehicle in accordance with the flight control instruction and through a pre-set algorithm, to complete an action specified by the flight control instruction.

In the above process, the aerial vehicle flies in accordance with a trajectory predetermined by the flight control instruction.

S305: After adjustment on the power output of the aerial vehicle in accordance with the flight control instruction is completed, turn on the control over the power output of the aerial vehicle in accordance with the return point position information.

After the action specified by the flight control instruction is completed, if the signal receiving element does not detect receipt of a new control flight instruction, it is feasible to trigger a control system of the aerial vehicle to make it continue to return, that is, turning on the control over the power output of the aerial vehicle in accordance with the return point position information. Further, when the adjustment of the flight control instruction on the power output of the aerial vehicle is completed, it is feasible to turn on the control over the power output of the aerial vehicle in accordance with the return point position information after a pre-set time, that is, the return is continued, and step S303 is performed.

In this embodiment, after it is detected in the process of return that the flight control instruction for the aerial vehicle is received, the aerial vehicle may also execute the flight control instruction, exit from the return state and no longer continue to return, and all flight and actions thereafter are decided in accordance with the user's operation and/or environment parameters of the aerial vehicle. That is, if step S304 is performed, step S305 is not performed, and the aerial vehicle may not to go back to perform step S303.

With the embodiments of the present disclosure, it is possible to operate the aerial vehicle in the process of return, which enhances security and operation flexibility of the aerial vehicle.

Figure 4:
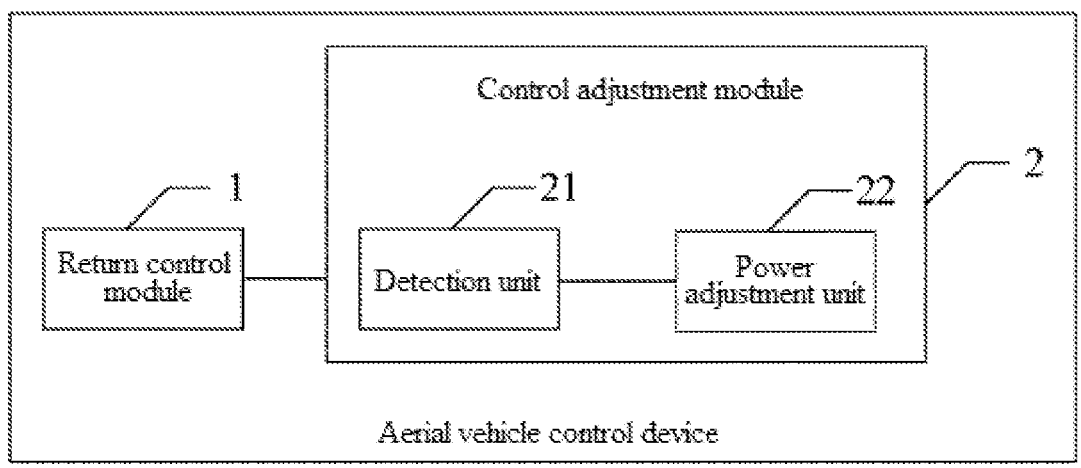
FIG. 4 is a schematic structural diagram of an aerial vehicle control device according to an embodiment of the present disclosure.

Referring to FIG. 4, FIG. 4 is a schematic structural diagram of an aerial vehicle control device according to an embodiment of the present disclosure. The device according to the embodiments of the present disclosure may be applied to a variety of aerial vehicles such as multi-rotor aerial vehicles and fixed-wing aerial vehicles, wherein the multi-rotor aerial vehicles may include various kinds of aerial vehicles such as four-rotor aerial vehicles, six-rotor aerial vehicles, eight-rotor aerial vehicles and aerial vehicles with more or less rotors. One aerial vehicle control device embodiment comprises:

a return control module 1 used for, upon receipt of an auto return instruction, controlling power output of an aerial vehicle in accordance with return point position information to make the aerial vehicle return to a return point; and a control adjustment module 2 used for, in the process of return, if a flight control instruction is detected, adjusting the power output of the aerial vehicle in accordance with the flight control instruction.

The return control module 1 detects a signal received by the aerial vehicle, and determines power output of the aerial vehicle in accordance with a return point if an auto return instruction is received, to make the aerial vehicle fly towards the return point. In the process of auto return, the aerial vehicle flies towards the return point in accordance with pre-set attitude information, wherein the attitude information may include a flight altitude, a flight speed, a flight direction and so on.

In this embodiment, the control adjustment module 2 comprises:

a detection unit 21 used for, in the process of return, detecting whether or not a flight control instruction for the aerial vehicle is received; and a power adjustment unit 22 used for, if the detection unit detects that the flight control instruction for the aerial vehicle is received, adjusting the power output of the aerial vehicle in accordance with the return point position information and the flight control instruction.

In the process of return, the detection unit 21 detects whether or not the flight control instruction for the aerial vehicle is received. The flight control instruction may be an operation instruction sent by a user control end, which is used for controlling power output of the aerial vehicle through the operation instruction, so as to achieve a change of attitude of the aerial vehicle to complete a user-expected action.

In the detection process, if the strength of a signal received by a signal receiving element is greater than a pre-set threshold, the signal is considered as a flight control instruction, otherwise, the signal is considered as a noise signal and is ignored.

If the flight control instruction for the aerial vehicle is received, the power adjustment unit 22 may superimpose a return instruction generated in accordance with the return point position information and the fight control instruction, and control the power output of the aerial vehicle in accordance with the superimposed instruction.

At this point, the power adjustment unit 22 may superimpose the return instruction and the flight control instruction, that is, on the basis of the power output of each power assembly calculated by the return instruction, the power output of each power assembly when the flight control instruction is executed is superimposed thereon, and new power output of each power assembly is set through a pre-set algorithm, so as to execute the flight control instruction at the same time when the return instruction is executed.

In the process, when the aerial vehicle executes the flight control instruction, the power adjustment unit 22 also takes parameters of the return instruction into account, and obtains a control instruction by integrating the flight control instruction and the parameters of the return instruction, to control power output of the aerial vehicle.

In addition, when the flight control instruction is received, the power adjustment unit 22 may also generate a control instruction by integrating the return point position information and the flight control instruction, that is, power output of each power assembly of the aerial vehicle is calculated and set through a pre-set algorithm in accordance with the return point position information and the flight control instruction.

In the process, when the aerial vehicle executes the flight control instruction, the power adjustment unit 22 also takes parameters of the return point position information into account, and obtains a control instruction by integrating the flight control instruction and the parameters of the return point position information, to control power output of the aerial vehicle.

A flight trajectory of the aerial vehicle is determined by a control instruction, which is obtained by integrated calculation of the return instruction and the flight control instruction or obtained by integrated calculation of information of the return point and the flight control instruction. Hence, the flight trajectory is between a return trajectory and a predetermined trajectory of the flight control instruction.

The user can send multiple flight control instruction, to ensure that the aerial vehicle bypasses the obstacle. Further, the user can also send the flight control instruction to make the aerial vehicle complete other actions in the process of return, for example, the aerial vehicle flies to a particular position, including flying at a particular altitude or flying a particular distance to shoot a picture and so on.

If the flight control instruction is not received, the adjustment unit 22 does not adjust the power output of the aerial vehicle, and the aerial vehicle continues to return.

In addition, when the flight control instruction is received, the adjustment unit 22 may also interrupt the return, that is, interrupt the control over the power output of the aerial vehicle in accordance with the return point position information, and calculate and set power output of each power assembly of the aerial vehicle in accordance with the flight control instruction through a pre-set algorithm, to complete an action specified by the flight control instruction.

In the above process, the aerial vehicle flies in accordance with a trajectory predetermined by the flight control instruction.

After the action specified by the flight control instruction is completed, if the detection unit 21 does not detect receipt of a new control flight instruction, the power adjustment unit 22 adjusts the aerial vehicle to restore the return state in accordance with the return point position information, that is, turning on the control over the power output of the aerial vehicle in accordance with the return point position information. Further, once the adjustment of the flight control instruction on the power output of the aerial vehicle is completed, it is feasible to turn on the control over the power output of the aerial vehicle in accordance with the return point position information after a pre-set time.

In addition, after it is detected in the process of return that the flight control instruction for the aerial vehicle is received, the aerial vehicle may execute the flight control instruction and exit from the return state. That is, the power adjustment unit 22 sets the power output of the aerial vehicle in accordance with the flight control instruction, the return is no longer continued, and all flight and actions thereafter are determined in accordance with the user's operation and/or environment parameters of the aerial vehicle.

Reference can be made to the descriptions in the corresponding embodiments of FIG. 1, FIG. 2 and FIG. 3 for specific implementation of each module and unit in the video processing device according to the embodiments of the present disclosure.

The aerial vehicle control device according to the embodiments of the present disclosure can receive a flight control instruction in the process of return, which makes the aerial vehicle operation safer and more flexible and can meet more demands of users.

Figure 5:
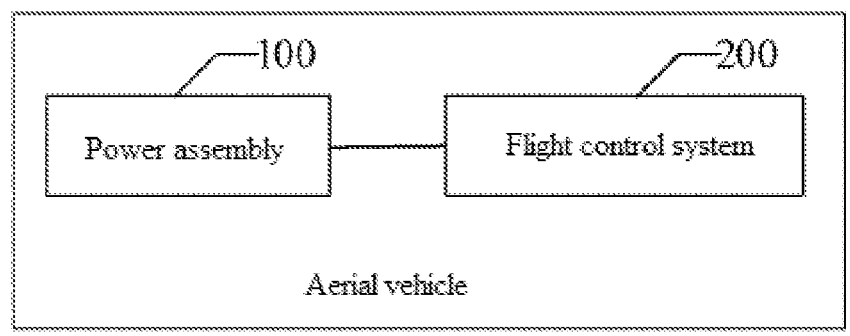
FIG. 5 is a schematic structural diagram of an aerial vehicle according to an embodiment of the present disclosure.

Referring to FIG. 5, FIG. 5 is a schematic structural diagram of an aerial vehicle according to an embodiment of the present disclosure; the aerial vehicles according to the embodiments of the present disclosure may be a variety of aerial vehicles such as multi-rotor aerial vehicles and fixed-wing aerial vehicles, wherein the multi-rotor aerial vehicles may include various kinds of aerial vehicles such as four-rotor aerial vehicles, six-rotor aerial vehicles, eight-rotor aerial vehicles and aerial vehicles with more or less rotors. Specifically, in this embodiment, the aerial vehicle comprises a power assembly 100 and a flight control system 200.

The power assembly 100 is used for providing power output for the aerial vehicle, and the power assembly 100 may include an electronic speed adjustor, a motor, a propeller and so on. In accordance with the number of propellers of the aerial vehicle, the aerial vehicle may include a corresponding number of the power assemblies 100, in order to provide power for the propellers.

The flight control system 200 is used for, upon receipt of an auto return instruction, controlling power output of the power assembly 100 in accordance with return point position information to make the aerial vehicle return to a return point; and in the process of return, if a flight control instruction is detected, adjusting the power output of the power assembly 100 in accordance with the flight control instruction.

The flight control system 200 may include a signal receiving element and a control element. The signal receiving element is used for detecting and receiving an instruction, and the control element is used for calculating and setting a rotation speed of a drive motor of each power assembly 100 in accordance with the received instruction and through a pre-set algorithm, so as to control one or more of a flight speed, a flight altitude and a flight direction of the aerial vehicle.

The flight control system 200 may be used for, in the process of return, detecting whether or not a flight control instruction for the aerial vehicle is received; and if a flight control instruction is received, adjusting the power output of the power assembly 100 in accordance with the return point position information and the flight control instruction.

The flight control system 200 may be used for superimposing a return instruction generated in accordance with the return point position information and the fight control instruction, and controlling the power output of the power assembly 100 in accordance with the superimposed instruction.

Specifically, in the process of return of the aerial vehicle, it is feasible to generate a return instruction in accordance with the return point position information, for example, GPS information of the return point and so on. The return instruction calculates a specific control instruction for the power assembly 100 through a pre-set algorithm, that is, the return instruction calculates power output of each power assembly when a return action is to be performed, and the control instruction is sent to the power assembly 100.

When the flight control instruction is received, it is feasible to superimpose a return instruction generated in accordance with the return point position information and the fight control instruction, and control the power output of the aerial vehicle in accordance with the superimposed instruction.

At this point, the flight control system 200 of the aerial vehicle superimposes the return instruction on the flight control instruction, that is, on the basis of the power output of each power assembly 100 calculated by the return instruction, the power output of each power assembly 100 when the flight control instruction is executed is superimposed thereon, and new power output of each power assembly is set through a pre-set algorithm, so as to execute the flight control instruction at the same time when the return instruction is executed.

In the process, when the aerial vehicle executes the flight control instruction, the flight control system 200 also takes parameters of the return instruction into account, and obtains a control instruction by integrating the flight control instruction and the parameters of the return instruction, to control power output of the aerial vehicle.

The flight control system 200 may also be used for generating a control instruction in accordance with the return point position information and the flight control instruction, and controlling the power output of the power assembly 100 in accordance with the control instruction.

At this point, when the flight control instruction is received, it is also feasible to generate a control instruction by integrating the return point position information and the flight control instruction, that is, power output of each power assembly 100 of the aerial vehicle is calculated and set through a pre-set algorithm in accordance with the return point position information and the flight control instruction.

In the process, when the aerial vehicle executes the flight control instruction, the flight control system 200 also takes parameters of the return point position information into account, and obtains a control instruction by integrating the flight control instruction and the parameters of the return point position information, to control power output of the aerial vehicle.

A flight trajectory of the aerial vehicle is determined by a control instruction, wherein the control instruction is obtained by integrated calculation of the return instruction and the flight control instruction or obtained by integrated calculation of information of the return point and the flight control instruction. Hence, the flight trajectory is between a return trajectory and a predetermined trajectory of the flight control instruction.

In addition, the flight control system 200 may be used for, in the process of return, detecting whether or not a flight control instruction for the aerial vehicle is received; if a flight control instruction is received, suspending the control over the power output of the power assembly 100 in accordance with the return point position information, and adjusting the power output of the power assembly 100 in accordance with the flight control instruction; and after adjustment on the power output of the power assembly 100 in accordance with the flight control instruction is completed, turning on the control over the power output of the power assembly 100 in accordance with the return point position information.

Further, it is feasible to turn on the control over the power output of the power assembly 100 in accordance with the return point position information a pre-set time later after adjustment on the power output of the power assembly 100 in accordance with the flight control instruction is completed.

In addition, the flight control system 200 may control, after it is detected in the process of return that the flight control instruction for the aerial vehicle is received, execute the flight control instruction, exit the return state, and no longer continue to return, and all flight and actions thereafter are determined in accordance with the user's operation and/or environment parameters of the aerial vehicle.

With aerial vehicles according to the embodiments of the present disclosure, control in the process of return can be achieved, which enhances operation flexibility and security of the aerial vehicle.

In the several embodiments provided in the present disclosure, it should be understood that the related devices and methods disclosed may be implemented in another manner. For example, the device embodiments described above are merely exemplary and explanatory, for example, division of the modules or units may merely represent an exemplary division of logical functions. There may be other manners of division in actual implementation. For example, a plurality of units or assemblies may be combined or integrated into another system, or some features may be omitted or not performed. In addition, the mutual coupling or direct coupling or communication connections displayed or discussed may be implemented by using some interfaces, and the indirect coupling or communication connections between the devices or units may be electrical, mechanical or in another form.

The units described as separate components may be or may not be physically separate, and components which are adjusted or detected as units may be or may not be physical units, may be located in one position, or may be distributed on a plurality of units. Some or all of the units may be selected according to actual needs to achieve the objectives of the solution of the embodiment.

In addition, functional units in the embodiments of the present disclosure may be integrated into one processing unit, or each of the units may be physically separate, or two or more units may be integrated into one unit. The aforementioned integrated units may be implemented in a form of hardware, or may be implemented in a form of a software functional unit.

When an integrated unit is implemented in the form of a software functional unit and sold or used as an independent product, the integrated unit may be stored in a computer-readable storage medium. Based on such an understanding, all or a part of the technical solutions consistent with the disclosure may be implemented in a form of a software product. The computer software product may be stored in a storage medium, and may include several instructions used for causing a computer processor to perform the whole or a part of a method consistent with embodiments of the disclosure, such as one of the exemplary methods described above. The foregoing storage medium may include: any medium that can store a program code, such as a USB flash drive, a removable hard disk, a Read-Only Memory (ROM), a Random Access Memory (RAM), a magnetic disk, or an optical disc.

The above descriptions are merely to present exemplary embodiments of the present disclosure, but are not intended to limit the scope of the present disclosure. Any equivalent structures or equivalent process flow modifications made by using contents of the specification and the drawings of the present disclosure, or directly or indirectly applied to other related technical fields, should be likewise included in the scope of the present disclosure.

What is claimed is:

1. An aerial vehicle control method comprising:
    detecting, during returning of an aerial vehicle to a return point along a return trajectory according to an auto return instruction, a flight control instruction that determines a predetermined trajectory different from the return trajectory;
    generating a superimposed instruction by superimposing return point position information indicating the return point and the flight control instruction, the superimposed instruction determining a flight trajectory that is an integration of the return trajectory and the predetermined trajectory and that is different from the return trajectory and the predetermined trajectory; and
    controlling the aerial vehicle to fly along the flight trajectory according to the superimposed instruction, wherein controlling the aerial vehicle to fly along the flight trajectory includes adjusting a power output of a power assembly of the aerial vehicle in accordance with the superimposed instruction by superimposing a power output for the power assembly calculated according to the flight control instruction on a power output for the power assembly calculated according to the auto return instruction.

2. The aerial vehicle control method of claim 1, wherein adjusting the power output of the power assembly includes sending the superimposed instruction to the power assembly to control the power output of the power assembly.

3. The aerial vehicle control method of claim 1, wherein adjusting the power output of the power assembly includes adjusting a speed of the power assembly to control at least one of a flight speed, a flight altitude, or a flight direction of the aerial vehicle.

4. The aerial vehicle control method of claim 1, further comprising, after an action specified by the flight control instruction is completed:
    controlling the aerial vehicle to fly in accordance with the return point position information to cause the aerial vehicle to continue to return to the return point.

5. The aerial vehicle control method of claim 4, wherein controlling the aerial vehicle to fly in accordance with the return point position information includes waiting for a preset time period after the action is completed before controlling the aerial vehicle to fly in accordance with the return point position information.

6. The aerial vehicle control method of claim 1, wherein the flight control instruction includes an operation instruction sent by a remote control end.

7. The aerial vehicle control method of claim 1, wherein detecting the flight control instruction comprises determining whether a received signal is greater than a pre-set threshold.

8. The aerial vehicle control method of claim 1, wherein the auto return instruction includes at least one of a return instruction sent from a remote control end, a return instruction generated when a remote control signal from the remote control end is not received within a pre-set time range, or a return instruction generated when a battery capacity value reaches a certain value.

9. The aerial vehicle control method of claim 1, wherein the return point position information includes at least one of global positioning system (GPS) coordinates of the return point, information about a relative distance between the return point and a current position of the aerial vehicle, or information about relative direction between the return point and the current position.

10. An aerial vehicle, comprising:
    a power assembly configured to provide power output for the aerial vehicle; and
    a flight control system configured to:
        detect, during returning of the aerial vehicle to a return point along a return trajectory according to an auto return instruction, a flight control instruction that determines a predetermined trajectory different from the return trajectory;
        generate a superimposed instruction by superimposing return point position information indicating the return point and the flight control instruction, the superimposed instruction determining a flight trajectory that is an integration of the return trajectory and the predetermined trajectory and that is different from the return trajectory and the predetermined trajectory; and
        control the aerial vehicle to fly along the flight trajectory according to the superimposed instruction, including adjusting a power output of a power assembly of the aerial vehicle in accordance with the superimposed instruction by superimposing a power output for the power assembly calculated according to the flight control instruction on a power output for the power assembly calculated according to the auto return instruction.

11. The aerial vehicle of claim 10, wherein the flight control system is further configured to send the superimposed instruction to the power assembly to control the power output of the power assembly.

12. The aerial vehicle of claim 10, wherein the flight control system is further configured to adjust a speed of the power assembly to control at least one of a flight speed, a flight altitude, or a flight direction of the aerial vehicle.

13. The aerial vehicle of claim 10, wherein the flight control system is further configured to, after an action specified by the flight control instruction is completed:
    control the aerial vehicle to fly in accordance with the return point position information to cause the aerial vehicle to continue to return to the return point.

14. The aerial vehicle of claim 10, wherein the flight control instruction includes an operation instruction sent by a remote control end.

15. The aerial vehicle of claim 10, wherein the flight control system is further configured to determine whether a received signal is greater than a pre-set threshold.

16. The aerial vehicle of claim 10, wherein the auto return instruction includes at least one of a return instruction sent from a remote control end, a return instruction generated when a remote control signal from the remote control end is not received within a pre-set time range, or a return instruction generated when a battery capacity value reaches a certain value.

17. The aerial vehicle of claim 10, wherein the return point position information includes at least one of global positioning system (GPS) coordinates of the return point, information about a relative distance between the return point and a current position of the aerial vehicle, or information about relative direction between the return point and the current position.

18. A non-transitory computer readable storage medium storing instructions that, when executed by a processor, cause the processor to:

detect, during returning of an aerial vehicle to a return point along a return trajectory according to an auto return instruction, a flight control instruction that determines a predetermined trajectory different from the return trajectory;

generate a superimposed instruction by superimposing return point position information indicating the return point and the flight control instruction, the superimposed instruction determining a flight trajectory that is an integration of the return trajectory and the predetermined trajectory and that is different from the return trajectory and the predetermined trajectory; and control the aerial vehicle to fly along the flight trajectory according to the superimposed instruction, wherein controlling the aerial vehicle to fly along the flight trajectory includes adjusting a power output of a power assembly of the aerial vehicle in accordance with the superimposed instruction by superimposing a power output for the power assembly calculated according to the flight control instruction on a power output for the power assembly calculated according to the auto return instruction.

* * * * *